Oct. 19, 1926.
R. H. WHITELEGG
1,603,436
STEAM TURBINE LOCOMOTIVE
Filed Oct. 4, 1924
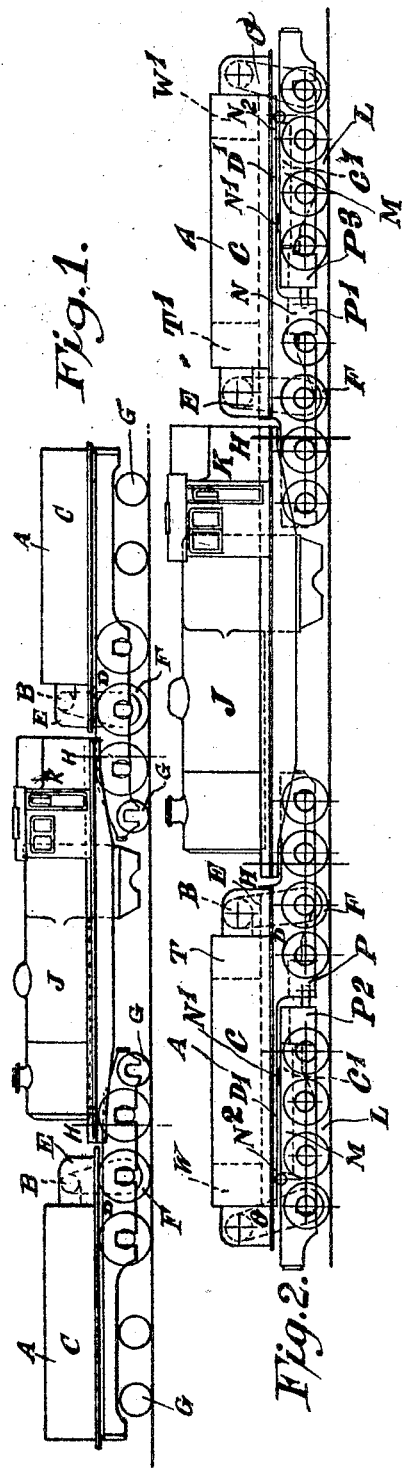
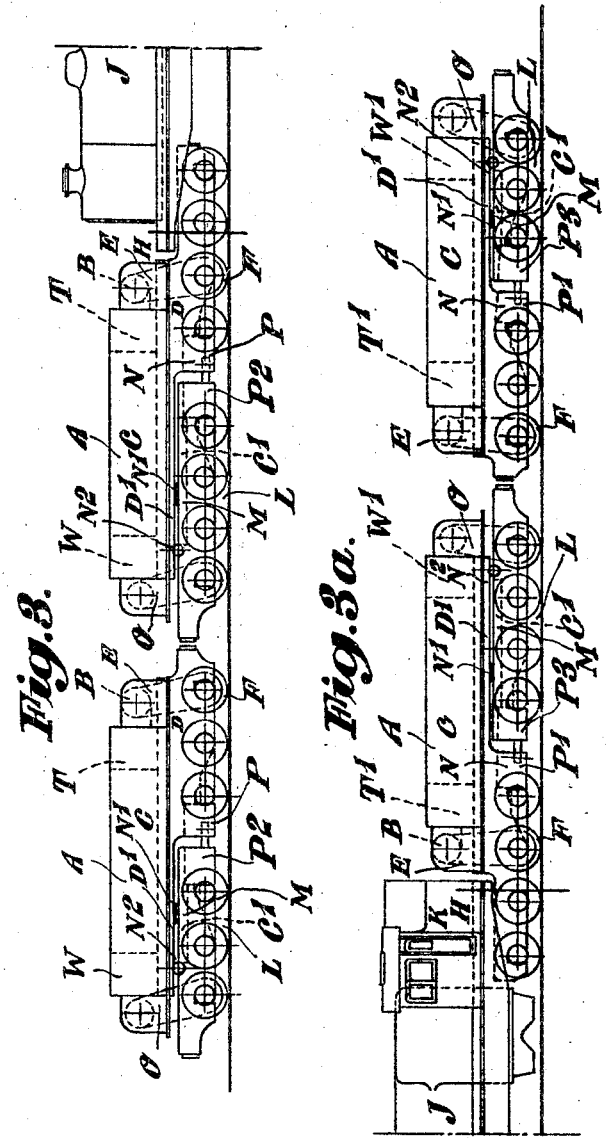

UNITED STATES PATENT OFFICE.

ROBERT HARBEN WHITELEGG, OF MANCHESTER, ENGLAND.

STEAM TURBINE LOCOMOTIVE.

Application filed October 4, 1924, Serial No. 741,566, and in Great Britain October 11, 1923.

This invention relates to improvements in steam locomotives, and similar vehicles, and has particular reference to articulated locomotives of the type comprising two power driven units with water and fuel tanks, and a common boiler unit flexibly connected at or near its ends to the said two power driven units, the said boiler being free from the restrictions imposed by driving or carrying wheels and their accessories, and by water and fuel tanks placed at the sides of the boiler, thereby allowing the maximum space for the provision of large boiler of any type, with easy access to all parts of the boiler and to all the desired accessories of the boiler.

The present invention has for its object to provide improvements whereby the efficiency of the locomotive will be increased, and in its simplest form comprises an articulated locomotive of the type comprising a boiler carried by a frame flexibly connected at or near each end to a power driven unit wherein one of the power driven units is actuated by reciprocating piston engines as heretofore, while the other power driven unit is actuated by one or more turbines, or one or more turbines in addition to one or more reciprocating piston engines. Each power driven unit may be actuated by one or more turbines, or one or more turbines in addition to one or more reciprocating piston engines. The turbine or turbines or reciprocating piston engines may be arranged to exhaust into condensers attached to the frame-work of the power driven unit or units.

The advantages to be derived from the use of turbines and condensers are well known, and this invention provides means whereby such advantages may be more efficiently applied to articulated locomotives. Hitherto, it has not proved possible to provide articulated locomotives wherein the driving turbine or turbines and condensers are fixed rigidly to each other and to the frame work of the power driven unit. In this invention the turbines and condensers may be fixed as an integral part of the power driven unit or units, thus obviating the use of large flexible pipes for the exhaust steam, and providing means whereby the weight of the turbines and condensers may be available for use in steadying the power driven units when the locomotive is working. The invention also provides means whereby such turbines and condensers may be provided without in any way restricting the space desired for the provision of large boilers of any type, if desired, with air preheaters, feed water heaters and other devices to secure maximum economy.

In carrying the invention into practice, the preferable arrangement will be to provide each power driven unit with its own driving turbine or turbines and condenser, as by this means the weight of the locomotive will be more evenly distributed between the articulated units, and according to one method it is proposed to provide each power driven unit with one or more steam turbines, the said turbines being connected to the driving wheels by toothed gearing, shafts, rods, flexible connections and the like, or the connection may be made by means of electric, hydraulic, or other suitable method of power transmission. The turbines and condensers may be attached to each other and to the frame-work of the power driven unit or units in any suitable position.

The turbines may be "simple" on each power unit or they may be "compounded" on one unit or with the turbines of the other unit in any desired method. They may be connected with each other and with the common boiler by suitable flexible and rigid pipes and connections. The steam from the turbines will be exhausted finally into the condensers.

We may provide one power unit only with a driving turbine or turbines and the other unit with reciprocating piston engines as in known type, such turbines and engines being "simple" or "compound" in any desired method. In such case, we may provide each or either unit with a condenser to work in conjunction with one or more turbines or one or more turbines together with reciprocating piston engines, or one unit may be provided with a condenser and other unit with tanks for water and fuel as desired.

Each or either power driven unit may be provided with a combination of turbine and reciprocating piston engines for effecting the drive, such turbines and engines being "simple" or "compound" as may be desired.

We may provide each or either power driven unit with one or more additional groups of driving wheels, each such group having its own framework and being flexibly connected to the adjacent group or unit. Each additional group of wheels will preferably have its own driving mechanism, but we may drive any number of groups of wheels or units or both from one driving source, by means of rods, gearing, power transmission and the like. Additional groups of wheels may have turbines or reciprocating piston engines or both as the driving source, such driving sources being connected to the wheels in manner before described, and being "simple" or "compound" in any desired method with each other or with the driving sources of other groups or units or with both. In this case, condensers will preferably be rigidly attached to the frameworks of the units nearest to the boiler unit, and flexibly connected to, or supported upon the frameworks of the additional groups of wheels, but it will be obvious that such condensers may be rigidly or flexibly connected to any framework as may be desired, also that the turbines may be flexibly connected to condensers.

We may provide any number of additional power driven units having one or more groups of driving wheels, frameworks and driving mechanism as before described, and flexibly connected to adjacent groups of wheels or units or both. Each such additional group or unit will take steam from the common boiler, and each such group or unit may be provided with condensers or any or all of the driving sources of one group or unit may exhaust into a condenser common to another group of units, and such driving sources may be "simple" or "compound" in any desired method with each other or with the driving sources of other groups or units. The turbine and condensers may be of any desired form or system.

We may provide any number of additional condensers attached to frameworks having bogie or carrying wheels only as may be desired. Bogie or carrying wheels may be provided on any power driven unit or group of wheels or both as may be desired.

The size, number, and position of driving or coupled wheels, as also bogie or carrying wheels may be as desired.

The fuel tank for coal, oil or the like will preferably be carried on the boiler unit at any convenient place, but it may be carried at any convenient part or parts of a power driven unit or units.

Water tanks may be carried at any convenient part of the boiler or power driven unit as desired. The locomotive may be provided at any convenient part with steam electric, steam-hydraulic, or other suitable form of power generator or converter, and such generator or converter may be suitably connected to supply driving power to any groups of wheels or units. It will be understood that in such case, additional groups of wheels or units will not necessarily be directly connected to adjacent groups or units, they may be remote if desired.

The power generators or converters may be "simple" or "compound" in any desired method with each other or with the driving sources of any group or unit.

Any group of wheels or units may be arranged for use in conjunction with rack rails, centre rails, and the like.

Notwithstanding the particular reference mentioned it is understood that we may apply this invention, or such parts of it as may be applicable, to all types of articulated locomotives, which are characterized by the provision of power driven groups of wheels or power driven units flexibly connected to a common boiler unit.

Referring to the drawings accompanying this specification, Figs. 1, 2 and 3, 3ª show three embodiments of this invention, but it will be obvious that other embodiments may be obtained without in any way departing from the spirit of the invention.

Fig. 1 illustrates generally the preferable arrangement, each articulated power driven unit A having driving turbine or turbines B and condenser C attached to each other and to the framework D of the unit A.

E indicates toothed gearing and flexible shafts and the like as being one method of connecting the turbines to the driving wheels F, but it will be obvious that other suitable methods may be adopted as desired. G indicates carrying wheels or bogies. H indicates the articulating centres between the power units A and the boiler unit J. K indicates one convenient position for the fuel tank. Water tanks may be provided at any convenient place on the locomotive, and either the fore or rear unit A may be provided with reciprocating piston engines instead of turbines B or both units A may be provided with reciprocating piston engines in addition to turbines B. The size, number and position of wheels F G may be as desired. Fig. 2 shows another embodiment of the invention wherein are provided additional groups of wheels L to the articulated power driven units A, the frameworks M of the additional groups L are shown flexibly connected in one method to the frameworks D of units A at points N, N¹, N² but it will be obvious that other suitable methods of flexibly connecting L to A may be used. O indicates one method of applying driving mechanism to the additional groups of wheels, but such mechanism may be of other suitable form. D¹ indicates extensions of the frameworks of the units A, and C shows condensers attached thereto as described. It will be obvious that such condensers may be rigidly or flexibly attached to each or either of the frameworks of A and L as may be desired. P, P¹, P², P³ indicate reciprocating piston engines. W¹, W indicate water tanks and T, T fuel tanks, and C¹, C¹ indicate condensers.

In the modification shown in Fig. 3, 3ª the same references are given as to the corresponding parts in Fig. 2.

The provision of any number of additional power driven groups of wheels or additional power driven units will be obvious from the drawings, and it will be understood that the term "power driven unit" indicates one or more power driven groups of wheels with frameworks, driving mechanisms and the like, and to which is attached as an integral part, water or fuel tanks or condensers, or any combination of tanks and condensers thus forming a separate unit.

Power generators or converters may be provided at any convenient part of the locomotive.

What I claim and desire to secure by Letters Patent is:—

1. An articulated locomotive comprising in combination a boiler unit comprising a boiler mounted on a supporting frame, two power driven units having power driving wheels, two condensers, a reciprocating piston engine and a turbine, the turbine being on one power unit and the reciprocating piston engine on the other, and the frame of the boiler unit flexibly supported at each end on the power units, each power unit having a condenser as an integral part thereof.

2. An articulated locomotive comprising in combination a boiler unit comprising a boiler mounted on a supporting frame, two power-driven units having power driving wheels, a plurality of water tanks, a plurality of reciprocating piston engines, and a plurality of turbines, each power unit being provided with both turbines and reciprocating piston engines, and the frame of the boiler unit flexibly supported at each end on the power units, and each power unit having a water tank as an integral part thereof.

3. An articulated locomotive comprising in combination a boiler unit comprising a boiler mounted on a supporting frame, two power driven units having power driving wheels, a plurality of fuel tanks, a reciprocating piston engine, and a turbine, the turbine being on one power unit and the reciprocating piston engine on the other, while the frame of the boiler unit is flexibly supported at each end on the power units each of which has a fuel tank as an integral part thereof.

4. An articulated locomotive comprising in combination a boiler unit comprising a boiler mounted on a supporting frame, two power-driven units having power driving wheels, a plurality of condensers, a plurality of reciprocating piston engines, and a plurality of turbines, each power unit being provided with both turbines and reciprocating piston engines, while the frame of the boiler unit is flexibly supported at each end on the power units, and each power unit has a condenser as an integral part thereof.

5. An articulated locomotive comprising in combination a boiler unit comprising a boiler mounted on a supporting frame, two power driven units having power driving wheels, a plurality of condensers, and water tanks, a reciprocating piston engine and a turbine, the turbine being on one power unit and the reciprocating piston engine on the other, and the frame of the boiler unit flexibly supported at each end beyond the boiler on the power units, each power unit having a condenser and a water tank as an integral part thereof.

6. An articulated locomotive comprising in combination a boiler unit comprising a boiler mounted on a supporting frame, two power driven units having power driving wheels, a plurality of water tanks and condensers, a plurality of reciprocating piston engines, and a plurality of turbines, each power unit being provided with both turbines and reciprocating piston engines while the frame of the boiler unit is flexibly supported at each end on the power units, and a water tank and a condenser formed as an integral part of each power unit.

7. An articulated locomotive comprising in combination a boiler unit comprising a boiler mounted on a supporting frame, two power driven units having power driving wheels, a plurality of condensers, water tanks and fuel tanks, a reciprocating piston engine and a turbine, the turbine being on one power unit and the reciprocating piston engine on the other, and the frame of the boiler flexibly supported at each end beyond the boiler on a power unit having a condenser, a water tank and a fuel tank as an integral portion thereof.

8. An articulated locomotive comprising in combination a boiler unit comprising a boiler mounted on a supporting frame, two power-driven units having power driven wheels, a plurality of condensers, water tanks, fuel tanks, reciprocating piston engines and turbines, each power unit being provided with a reciprocating piston engine and a turbine and having as an integral part thereof a condenser, a water tank and a fuel tank and supporting one end of the supporting frame of the boiler unit.

9. An articulated locomotive comprising in combination, a boiler unit comprising a boiler mounted on a supporting frame, two turbine driven units having power driving wheels, two condensers, each power unit flexibly supporting one end of the frame of the boiler unit and having a condenser as an integral part thereof.

10. An articulated locomotive comprising in combination, a boiler unit comprising a boiler mounted on a supporting frame, two power driven units having power driving wheels, a plurality of condensers, a reciprocating piston engine and a turbine, a power driven group of wheels, the turbine being on one power unit and the reciprocating piston engine on the other, while the power driven group of wheels is flexibly connected to one end of a power unit while one end of the boiler supporting frame is flexibly connected over the other end of the power unit and each power unit has a condenser as an integral portion thereof.

11. An articulated locomotive comprising in combination a boiler unit comprising a boiler mounted on a supporting frame, two power driven units having power driving wheels, a plurality of condensers, a plurality of reciprocating piston engines and turbines, a power driven group of wheels, each power driven unit having a turbine and a reciprocating piston engine and as an integral portion thereof a condenser and supporting one end of the boiler supporting frame, the end of one of the power units opposite that supporting the boiler supporting frame being flexibly connected to the power driven group of wheels.

12. An articulated locomotive comprising in combination a boiler unit comprising a boiler mounted on a supporting frame, two turbine driven units each having a condenser as an integral portion thereof, a power driven group of wheels, each power driven unit supporting one end of the boiler supporting frame at a point beyond the boiler while the end of one of them opposite that supporting the boiler frame is flexibly connected to the power driven group of wheels.

13. An articulated locomotive comprising in combination, a boiler unit comprising a boiler mounted on a supporting frame, two power driven units having power driving wheels, a plurality of liquid tanks, a reciprocating piston engine and a turbine, a power driven group of wheels, the turbine being on one power unit and the reciprocating piston engine on the other, while the power driven group of wheels is flexibly connected to one end of a power unit while one end of the boiler supporting frame is flexibly connected over the other end of the power unit and each power unit has a liquid tank as an integral portion thereof.

14. An articulated locomotive comprising in combination, a boiler unit comprising a boiler mounted on a supporting frame, two power driven units having power driving wheels, a plurality of liquid tanks, a plurality of reciprocating piston engines and turbines, a power driven group of wheels, each power driven unit having a turbine and a reciprocating piston engine and as an integral portion thereof a liquid tank and supporting one end of the boiler supporting frame, the end of one of the power units opposite that supporting the boiler supporting frame being flexibly connected to the power driven group of wheels.

15. An articulated locomotive comprising in combination boiler unit comprising a boiler mounted on a supporting frame, two turbine driven units each having a liquid tank as an integral portion thereof, a power driven group of wheels, each power driven unit supporting one end of the boiler supporting frame at a point beyond the boiler while the end of one of them opposite that supporting the boiler frame is flexibly connected to the power driven group of wheels.

16. An articulated locomotive comprising in combination a boiler unit comprising a boiler mounted on a supporting frame, two power driven units having power driving wheels, a plurality of condensers and liquid tanks, a reciprocating piston engine and a turbine, a power driven group of wheels, the turbine being on one power unit and the reciprocating piston engine on the other, while the power driven group of wheels is flexibly connected to one end of a power unit while one end of the boiler supporting frame is flexibly connected over the other end of the power unit and each power unit has a condenser and a liquid tank as an integral portion thereof.

17. An articulated locomotive comprising in combination, a boiler unit comprising a boiler mounted on a supporting frame, two power driven units having power driving wheels, a plurality of condensers and liquid tanks, a plurality of reciprocating piston engines and turbines, a power driven group of wheels, each power driven unit having a turbine and a reciprocating piston engine and as an integral portion thereof a condenser and liquid tank and supporting one end of the boiler supporting frame, the end of one of the power units opposite that supporting the boiler supporting frame being flexibly connected to the power driven group of wheels.

18. An articulated locomotive comprising in combination a boiler unit comprising a boiler mounted on a supporting frame, two turbine driven units each having a condenser and liquid tank as an integral portion thereof, a power driven group of wheels, each power driven unit supporting one end of the boiler supporting frame at a point beyond the boiler while the end of one of them opposite that supporting the boiler frame is flexibly connected to the power driven group of wheels.

19. An articulated locomotive comprising in combination a boiler unit comprising a boiler mounted on a supporting frame, a plurality of power driven units each having power driving wheels and a condenser which is formed as an integral portion thereof, each end of the boiler frame being flexibly supported on one end of a power unit while the other end of a power unit is flexibly connected to another power unit.

20. An articulated locomotive comprising in combination a boiler unit comprising a boiler mounted on a supporting frame, a plurality of power driven units each having power driving wheels and liquid tanks which are formed as an integral portion thereof, each end of the boiler frame being flexibly supported on one end of a power unit while the other end of a power unit is flexibly connected to another power unit.

21. An articulated locomotive comprising in combination a boiler unit comprising a boiler mounted on a supporting frame, a plurality of power driven units each having power driving wheels and a condenser and liquid tanks which are formed as an integral portion thereof, each end of the boiler frame being flexibly supported on one end of a power unit while the other end of a power unit is flexibly connected to another power unit.

22. An articulated locomotive comprising in combination a boiler unit comprising a boiler mounted on a supporting frame, two power driven units, having power driving wheels, two condensers, a reciprocating piston engine, a turbine, and mechanical transmission gearing, the turbine being on one power unit and connected to the driving wheels by the mechanical transmission gearing, and the reciprocating piston engine being on the other power unit while the frame of the boiler unit is flexibly supported at each end on the power units each of which carries a condenser as an integral part thereof.

23. An articulated locomotive comprising in combination a boiler unit comprising a boiler mounted on a supporting frame, two power driven units having power driving wheels, a plurality of condensers, a plurality of reciprocating piston engines and turbines, and mechanical transmission gearing, each power unit being provided with both turbines connected to the driving wheels by the mechanical transmission gear, and also with a reciprocating piston engine while the frame of the boiler unit is flexibly supported at each end on a power unit having a condenser as an integral part thereof.

24. An articulated locomotive comprising in combination a boiler unit comprising a boiler mounted on a supporting frame, two power driven units having power driving wheels, a plurality of condensers, a plurality of turbines, and mechanical transmission gearing, each power unit being provided with turbines connected to the driving wheels by the mechanical transmission gear, while the frame of the boiler unit at points beyond the boiler is flexibly supported at each end of a power unit having a condenser as an integral part thereof.

In witness whereof I affix my signature.

ROBERT HARBEN WHITELEGG.